(12) United States Patent
Ewert (10) Patent No.: US 10,762,365 B2
(45) Date of Patent: Sep. 1, 2020

(54) METHOD AND DEVICE FOR TRAFFIC SIGN RECOGNITION

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 16/142,395

(22) Filed: Sep. 26, 2018

(65) Prior Publication Data

US 2019/0114493 A1    Apr. 18, 2019

(30) Foreign Application Priority Data

Oct. 12, 2017  (DE) .................. 10 2017 218 192

(51) Int. Cl.
*G06K 9/00* (2006.01)
*G06K 9/62* (2006.01)
*G05D 1/02* (2020.01)

(52) U.S. Cl.
CPC ....... *G06K 9/00818* (2013.01); *G05D 1/0246* (2013.01); *G06K 9/6201* (2013.01); *G05D 2201/0213* (2013.01)

(58) Field of Classification Search
CPC .......... G06K 9/00818; G06K 9/00805; G06K 9/00791; G06K 9/00798; G06K 9/00825; G06K 9/3241; G06K 9/6201; G06K 9/6293; G05D 2201/0213; G05D 1/0088; G05D 1/0246; B60K 2370/166; B60K 2370/178; B60W 2420/42; B60W 40/06; G06T 2207/30252; G06T 7/70; G06T 7/80; G08G 1/096725; G08G 1/0112; G08G 1/0967; G08G 1/096783
See application file for complete search history.

(56) References Cited

U.S. PATENT DOCUMENTS

| | | | |
|---|---|---|---|
| 6,560,529 B1 * | 5/2003 | Janssen | G06K 9/72 |
| | | | 701/469 |
| 6,801,638 B1 * | 10/2004 | Janssen | B60K 35/00 |
| | | | 382/104 |
| 8,041,080 B2 * | 10/2011 | Porikli | G06K 9/00818 |
| | | | 340/905 |

(Continued)

*Primary Examiner* — Jose L Couso
(74) *Attorney, Agent, or Firm* — Norton Rose Fulbright US LLP; Gerard Messina (57) ABSTRACT

A method is described for checking the plausibility of a recognition of a traffic sign for an autonomously driving vehicle. The method includes a step of reading in, in which an information signal and a position signal are read in via an interface to a vehicle device of the vehicle, the information signal representing a piece of information concerning a traffic sign in road traffic that is recognized using an optical sensor of the vehicle, and the position signal representing an instantaneous position of the vehicle. In addition, the method includes a step of comparing, in which the recognized traffic sign is compared to a sign that is noted on a stored map at the instantaneous position of the vehicle, using the information signal and the position signal. Lastly, the method includes a step of providing a confirmation signal at an interface to the vehicle device when the step of comparing results in a match of the recognized traffic sign with the sign that is noted at the relevant position of the vehicle.

14 Claims, 4 Drawing Sheets

(56) References Cited

U.S. PATENT DOCUMENTS

| | | | |
|---|---|---|---|
| 9,436,879 B2 * | 9/2016 | Zobel | G06K 9/00818 |
| 2008/0137908 A1 * | 6/2008 | Stein | G06K 9/00818 |
| | | | 382/103 |
| 2015/0220795 A1 * | 8/2015 | Fischer | G06K 9/00825 |
| | | | 348/148 |
| 2017/0154229 A1 * | 6/2017 | Yoshitomi | G08G 1/09623 |
| 2017/0336793 A1 * | 11/2017 | Shashua | B60W 30/14 |
| 2018/0120857 A1 * | 5/2018 | Kappauf | G01S 17/06 |
| 2019/0147257 A1 * | 5/2019 | Lindemann | G06K 9/00818 |
| | | | 382/103 |
| 2019/0279007 A1 * | 9/2019 | Zinner | G08G 1/09623 |
| 2020/0034988 A1 * | 1/2020 | Zhou | G06T 7/80 |

* cited by examiner

METHOD AND DEVICE FOR TRAFFIC SIGN RECOGNITION

FIELD OF THE INVENTION

The present invention is directed to a device or a method according to the definition of the species in the independent claims. A further subject matter of the present invention relates to a computer program.

BACKGROUND INFORMATION

Traffic signs are recognized, among other ways, with vehicle camera systems. For example, a maximum allowed speed is displayed to a driver of a vehicle, and the driver may appropriately adjust the speed of the vehicle.

SUMMARY

Against this background, using the approach presented here, a method for traffic sign recognition, a device that uses this method, and lastly, a corresponding computer program are provided.

By plausibility checking of traffic signs with the aid of a server, an autonomously driving vehicle may independently recognize traffic signs, as the result of which a driving pattern of a vehicle may be positively influenced. It is thus also possible to control the autonomously driving vehicle with regard to a maximum speed with the aid of such a system. In addition, the autonomous vehicle may be controlled via further traffic signs such as yield signs or stop signs. It is important for the signs in question to be reliably recognized in road traffic, since otherwise the autonomous vehicle is controlled inaccurately or in a manner that endangers traffic. The approach presented here for checking the plausibility of traffic signs may, for example, also reliably recognize traffic signs that are concealed by other road users or by bad weather. The safety in road traffic may thus be enhanced significantly.

A method for checking the plausibility of a recognition of a traffic sign for an autonomously driving vehicle is presented; the method may be carried out in a server, and includes the following steps:

Reading in an information signal and a position signal via an interface to a vehicle device of the vehicle, the information signal representing a piece of information concerning a traffic sign in road traffic that is recognized using an optical sensor of the vehicle, and the position signal representing an instantaneous position of the vehicle;

Comparing the recognized traffic sign to a sign that is noted on a stored map at the instantaneous position of the vehicle, using the information signal and the position signal; and Providing a confirmation signal at an interface to the vehicle device when the step of comparing results in a match of the recognized traffic sign with the sign that is noted on the map at the relevant position of the vehicle.

A traffic sign may be a symbol, writing, or a line that is set up on the street in the form of a sign or marked on the roadway, and that is used for influencing or controlling road traffic. A vehicle may be a vehicle for passenger transportation, for example a vehicle that travels in a semi or highly automated manner. An automated or autonomous vehicle is a vehicle that functions without a driver. The vehicle drives autonomously by, for example, independently recognizing the course of the roadway, other road users, or obstructions, computes the appropriate control commands in the vehicle, and relays them to the actuators in the vehicle, as the result of which the driving pattern of the vehicle is correctly influenced. In a fully autonomous vehicle, the driver does not take part in the driving operation. Alternatively, the vehicle may be a vehicle that is controlled by a driver. A vehicle device may be, for example, a control unit or driver assistance system of the vehicle. The interface to the vehicle device may have a wireless design. Driver assistance systems are electronic auxiliary units in motor vehicles, and are used to assist the driver in certain driving situations. Safety aspects as well as increasing the driving comfort are often the primary focus. Another aspect is the improvement in economy. Driver assistance systems semiautonomously or autonomously intervene in the drive, in controls such as acceleration/deceleration and braking, or in signaling devices of the vehicle, or warn the driver before or during critical situations via suitable human-machine interfaces. At the present time, most driver assistance systems are designed in such a way that the responsibility remains with the driver, who is therefore not relieved of control. Various types of surroundings sensor systems may be used for driver assistance systems, such as ultrasonic sensors as parking assistants, radar sensors as lane change assistants or automatic distance alerts, LIDAR sensors for blind spot monitoring, as automatic distance alerts, or for distance control, as well as cameras for traffic sign recognition, as lane change assistants, for blind spot monitoring, and as emergency braking systems for pedestrian protection. An optical sensor may be a camera, or in general, an image detection device for detecting objects in the surroundings of the vehicle. The optical sensor may be designed as a sensor device that may include a plurality of sensor elements that are combined and/or situated at different positions in the vehicle. A stored map may be a road map that is present in digital form, and which is stored on the server and may be continually updated. A server may be a processing unit and/or memory unit, situated external to the vehicle, which may be implemented in a so-called "cloud," for example.

According to one specific embodiment, in the step of providing, a negative signal may be provided at the interface to the vehicle device when the step of comparing does not result in a match of the recognized traffic sign with the sign that is noted on the map at the relevant position of the vehicle. According to one specific embodiment, in the step of providing, the server therefore provides a piece of information concerning the noted sign at the interface to the vehicle device. The information concerning the noted sign is now used in the vehicle as the truth, instead of the recognized traffic sign, in order to be able to control the autonomous vehicle.

According to one specific embodiment, in the step of providing, an "unknown" signal is provided at the interface to the vehicle device when no sign is noted on a stored map at the instantaneous position of the vehicle. The optical sensor of the vehicle recognizes an unknown traffic sign, for example, when the vehicle is traveling through a construction site. A piece of information concerning the unknown traffic sign may be stored in the vehicle memory in response to the "unknown" signal.

A method for recognizing a traffic sign for an autonomously driving vehicle is presented; the method may be carried out in a vehicle, and includes the following steps:

Reading in a recognition signal, the recognition signal representing a traffic sign in road traffic that is recognized using the optical sensor of the vehicle;

Providing an information signal and a position signal at an interface to a server, using the recognition signal, the information signal representing a piece of information concerning the traffic sign, and the position signal representing an instantaneous position of the vehicle; and Reading in a confirmation signal that represents a match of the recognized traffic sign with a sign that is noted on a map at the instantaneous position of the vehicle, via the interface to the server.

According to one exemplary embodiment, an uncertainty signal may be read in via an interface to the optical sensor of the vehicle in the step of reading in, the uncertainty signal representing an uncertainty in recognizing a traffic sign in road traffic. The position signal may be provided at the interface to the server in the step of providing, using the uncertainty signal. The uncertainty may be caused, for example, by fog or plants which may conceal a traffic sign. It is thus possible that the optical sensor of the vehicle may fail to detect the traffic sign. Within the context of this uncertainty, the sign that is noted on the map at the instantaneous vehicle position is relayed from the server to the vehicle, so that the autonomous vehicle may continue traveling in accordance with traffic regulations.

According to one exemplary embodiment, an uncertainty signal may be read in in the step of reading in, the uncertainty signal representing an uncertainty in recognizing a traffic sign in road traffic, which is recognized using the optical sensor of the vehicle. A sign recognition information signal may be read in from an interface to another vehicle in the step of reading in. In this way, for example use may be made of the fact that a preceding vehicle has reliably recognized the traffic sign. The information signal may be provided at the interface to the server in the step of providing, using the sign recognition information signal. The server may check the plausibility of the information provided by the other vehicle, using the information signal.

According to one exemplary embodiment, a piece of information concerning a recognized traffic sign, as a sign recognition information signal, may be provided to another vehicle in the step of providing, using the information signal and the position signal. The obtained information may be shared with other vehicles in this way.

According to one exemplary embodiment, a speed signal that represents an instantaneous speed of the vehicle, and additionally or alternatively, a distance signal that represents an instantaneous distance of the vehicle from the traffic sign, may be provided at the interface to the server in the step of providing. With the aid of the signal propagation times of the transmission and the transmitted information, the recognized traffic sign on the server may be compared even more accurately with regard to a map position.

According to one exemplary embodiment, in the step of reading in the confirmation signal, a traffic sign that is recognized as correct may be stored in a vehicle memory when the confirmation signal represents a match. The vehicle memory may be situated in the vehicle. For example, a digital map stored in the vehicle memory may be updated in this way.

A method for traffic sign recognition is presented, the method including the steps of a method for recognizing a traffic sign for an autonomously driving vehicle, and of a method for checking the plausibility of a recognition of a traffic sign for an autonomously driving vehicle. In this way, a system that includes components situated in a vehicle and in a server is implementable. A communication between the components may take place via a wireless connection, for example.

These stated methods may be implemented, for example, in a control unit, for example in software or hardware or in a mixed form of software and hardware.

The approach presented here also provides a device that is designed for carrying out, controlling, or implementing the steps of one variant of a method presented here in appropriate devices.

The object underlying the present invention may also be quickly and efficiently achieved by this embodiment variant of the present invention in the form of a device.

For this purpose, the device may include at least one processing unit for processing signals or data, at least one memory unit for storing signals or data, at least one interface to a sensor or an actuator for reading in sensor signals from the sensor or for outputting control signals to the actuator, and/or at least one communication interface for reading in or outputting data that are embedded in a communication protocol. The processing unit may be, for example, a signal processor, a microcontroller, or the like, and the memory unit may be a flash memory, an EEPROM, or a magnetic memory unit. The communication interface may be designed for reading in or outputting data wirelessly and/or in a line-bound manner; a communication interface which may read in or output the line-bound data may read in these data electrically or optically, for example, from an appropriate data transmission line, or output same to an appropriate data transmission line.

In the present context, a device may be understood to mean an electrical device which processes sensor signals and outputs control and/or data signals as a function thereof. The control unit may include an interface which may have a hardware and/or software design. In a hardware design, the interfaces may be part of a so-called system ASIC, for example, which contains various functions of the control unit. However, it is also possible for the interfaces to be dedicated, integrated circuits, or to be at least partially made up of discrete components. In a software design, the interfaces may be software modules which are present on a microcontroller, for example, in addition to other software modules.

Also advantageous is a computer program product or a computer program including program code which may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

DETAILED DESCRIPTION

In the following description of advantageous exemplary embodiments of the present invention, identical or similar reference numerals are used for the elements having a similar action which are illustrated in the various figures, and a repeated description of these elements is dispensed with.

Figure 1:
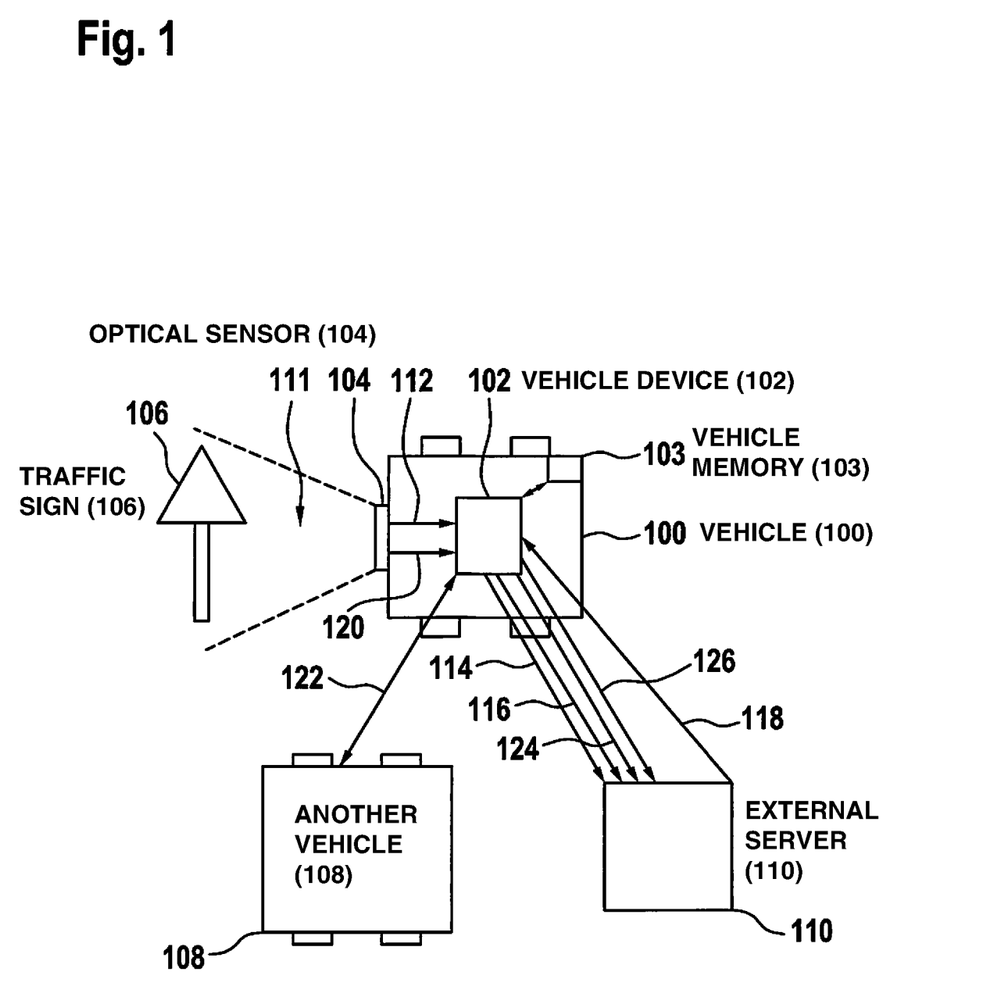
FIG. 1 shows a schematic view of a vehicle that includes a vehicle device for traffic sign recognition according to one exemplary embodiment.

FIG. 1 shows a schematic view of a vehicle 100 that includes a vehicle device 102 for traffic sign recognition according to one exemplary embodiment. The illustration includes vehicle 100, which includes vehicle device 102 for traffic sign recognition, optionally a vehicle memory 103, and an optical sensor 104. A traffic sign 106, another vehicle 108, and an external server 110, situated in a cloud, for example, are also illustrated.

Traffic sign 106 is situated in a detection range 111 of optical sensor 104 installed in vehicle 100. Optical sensor 104 recognizes traffic sign 106; according to one exemplary embodiment, optical sensor 104 is a camera or a surroundings sensor. Vehicle device 102 is designed for reading in a recognition signal 112 via an interface to optical sensor 104 of vehicle 100. Recognition signal 112 represents recognized traffic sign 106 in road traffic. Vehicle device 102 is designed for determining an information signal 114 and a position signal 116, using recognition signal 112, and providing them at an interface to server 110. Information signal 114 represents a piece of information concerning recognized traffic sign 106, and position signal 116 represents an instantaneous position of vehicle 100. The instantaneous position of vehicle 100 is provided, for example, by a position determination device of vehicle 100. Thus, using information signal 114 and position signal 116, the recognized type of traffic sign together with an instantaneous vehicle position is transmitted to server 110, for example via a car-to-X communication link. A car-to-X link is similar in design to a car-to-car communication, which is understood to mean the exchange of information and data between at least two vehicles. The objective of this data exchange is to provide early notification of critical and hazardous situations to the driver of vehicle 100. The vehicles in question collect data such as ABS interventions, steering angles, position, direction, and speed, and transmit these data wirelessly, for example via WLAN and UMTS, to other road users. The aim is to improve the visual range of the driver via electronic means. Recognized traffic sign 106 together with the position of vehicle 100 is mapped on a virtual map on server 110. A comparison of the recognized type of traffic sign to a sign that is already stored on this position of the maps subsequently takes place on the server. If the two signs match, a confirmation signal 118 representing a match of recognized traffic sign 106 with the sign noted on a map at the instantaneous position of vehicle 100 is read in via the interface to server 100. According to one exemplary embodiment, a piece of information concerning traffic sign 106 recognized as correct may be stored in vehicle memory 103 when confirmation signal 118 represents the match. Accordingly, server 110 immediately transmits a confirmation to vehicle 100 that traffic sign 106 has been correctly recognized. Traffic sign 106 is subsequently displayed to the vehicle driver, and only then does the autonomous vehicle respond to recognized traffic sign 106, confirmation signal 118 being used for controlling a driving maneuver via vehicle device 102. It is important for the car-to-X communication, i.e., the comparison of the recognized traffic sign on the server to the sign that is already stored on this position of the maps, to be implemented preferably quickly, since vehicle 100 may be traveling at a high speed. The aim is for vehicle 100 to receive feedback from server 110 no later than before vehicle 100 has traveled past traffic sign 106.

According to one exemplary embodiment, it is possible that vehicle 100 may fail to detect traffic sign 106 due to it being concealed at that moment or not clearly visible due to poor weather conditions. In this case, instead of a recognition signal 112, an uncertainty signal 120 is read in via an interface to optical sensor 104 of vehicle 100, uncertainty signal 120 representing an uncertainty in recognizing traffic sign 106 in road traffic. Position signal 116, i.e., a piece of information concerning an instantaneous position of vehicle 100, is subsequently provided directly at the interface to server 110, using uncertainty signal 120; the server may now transmit the correct sign from the map stored on server 110, via the car-to-X communication link to vehicle 100, at the correct point in time.

According to one exemplary embodiment, optical sensor 104 of the vehicle reads in uncertainty signal 120, a sign recognition information signal 122 being automatically read in from an interface to nearby other vehicle 108, and information signal 114 being provided at the interface to server 110, using sign recognition information signal 122. Vehicle 100 subsequently obtains from server 110 the correct sign from the map stored on server 110, transmitted via the car-to-X communication channel, at the correct point in time. In this exemplary embodiment, the same applies for host vehicle 100, which automatically relays a recognized traffic sign 106 to nearby other vehicle 108, vehicle 100 providing a piece of information concerning recognized traffic sign 106, as sign recognition information signal 122, to other vehicle 108, using information signal 114 and position signal 116.

According to one exemplary embodiment, a speed signal 124 that represents an instantaneous speed of vehicle 100 is provided at the interface to server 110. Additionally or alternatively, a distance signal 126, which represents an instantaneous distance of vehicle 100 from traffic sign 106, is provided at the interface to server 110. With the aid of the signal propagation times of the transmission and the transmitted information, traffic sign 106 on server 110 may be compared even more accurately with regard to a map position.

According to one exemplary embodiment, optical sensor 104 is designed for carrying out a signal evaluation in order to recognize traffic sign 106, for example. Correspondingly, optical sensor 104 may be a sensor device made up of at least one sensor element and a circuit, combined with the at least one sensor element, for the signal evaluation. Alternatively, such a circuit for the signal evaluation may be situated separately from the at least one sensor element and encompassed by vehicle device 102, for example.

Figure 2:
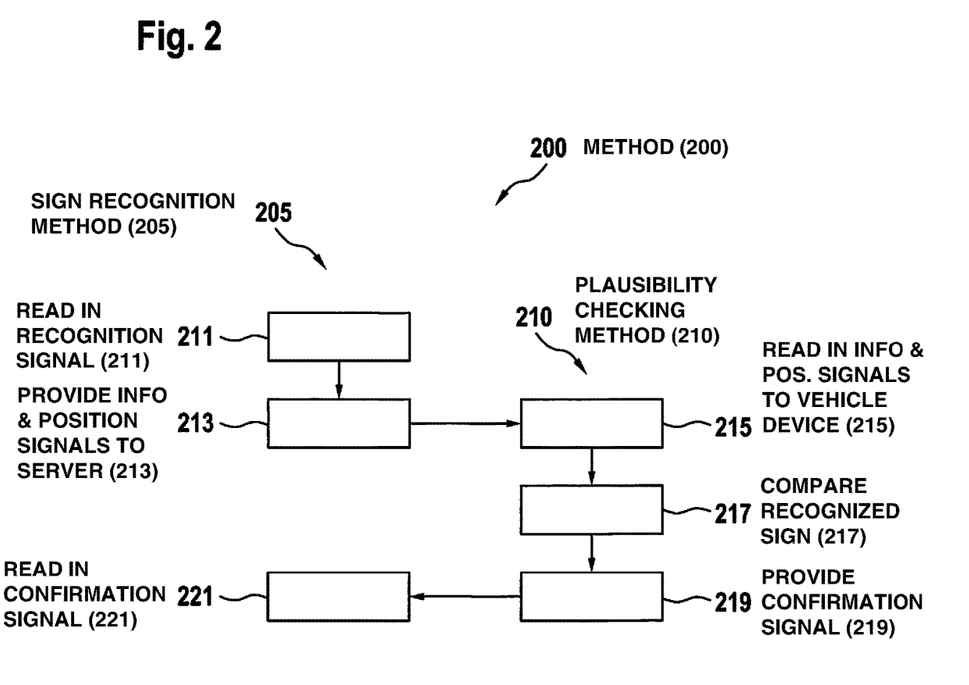
FIG. 2 shows a flow chart of one exemplary embodiment of a method for traffic sign recognition according to one exemplary embodiment.

FIG. 2 shows a flow chart of one exemplary embodiment of a method 200 for traffic sign recognition according to one exemplary embodiment. Method 200 may be carried out, for example, using the device for traffic sign recognition described with reference to FIG. 1. Method 200 for traffic sign recognition includes a method 205 for recognizing a traffic sign for an autonomously driving vehicle, and a method 210 for checking the plausibility of a recognition of a traffic sign for an autonomously driving vehicle. Methods 205, 210 may be carried out independently of one another in components situated separately from one another.

Method 200 includes, initially, a step 211 in which a recognition signal is read in via an interface to an optical sensor of the vehicle. The recognition signal represents a recognized traffic sign in road traffic. An information signal and a position signal are provided at an interface to a server, using the recognition signal, in a step 213. The information signal represents a piece of information concerning the traffic sign, and the position signal represents an instantaneous position of the vehicle. The information signal and the position signal are read in via an interface to a vehicle device of the vehicle in a further step 215, the information signal representing a piece of information concerning a traffic sign in road traffic that is recognized using an optical sensor of the vehicle, and the position signal representing an instantaneous position of the vehicle. The recognized traffic sign is compared to a sign noted on a stored map at the instantaneous position of the vehicle, using the information signal and the position signal, in a step 217. In addition, a confirmation signal is provided at an interface to the vehicle device in a step 219 when the step of comparing results in a match of the recognized traffic sign with the sign that is noted on the map at the relevant position of the vehicle. Lastly, a confirmation signal that represents a match of the recognized traffic sign with a sign that is noted on a map at the instantaneous position of the vehicle is read in via the interface to the server in a step 221.

Figure 3:
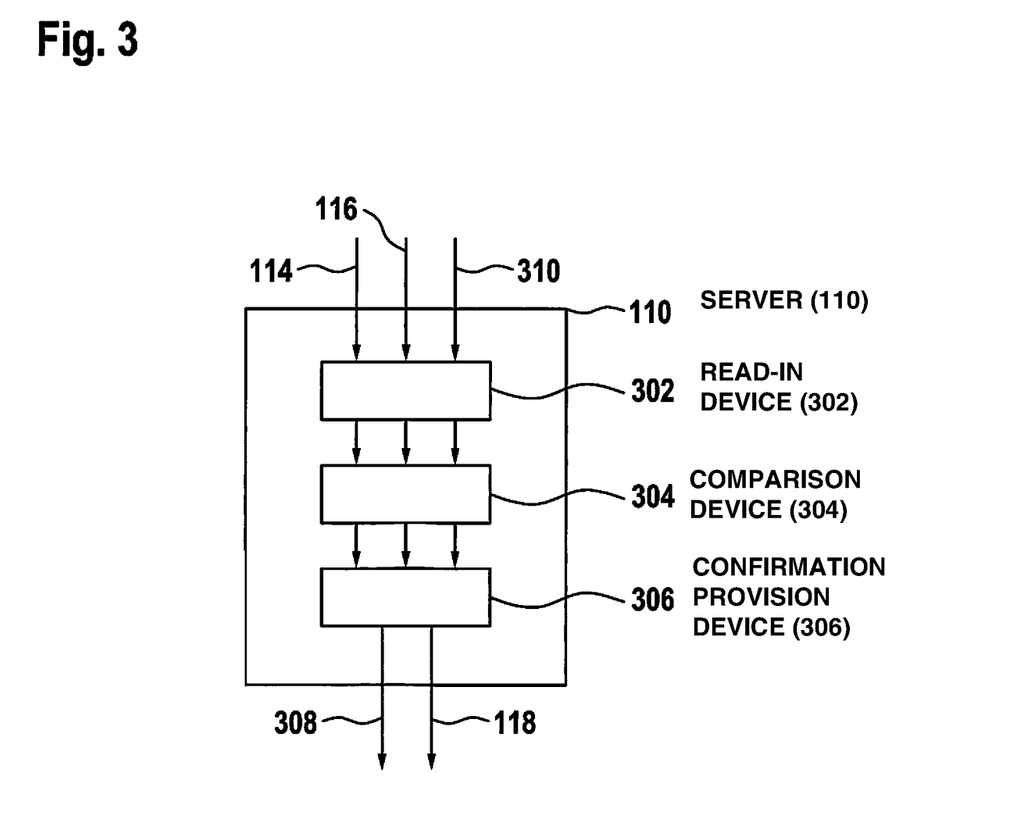
FIG. 3 shows a schematic view of a server according to one exemplary embodiment.

FIG. 3 shows a schematic view of a server 110 according to one exemplary embodiment. Server 110 shown in FIG. 3 may be, for example, server 110 shown in FIG. 1. Server 110 includes a read-in device 302, a comparison device 304, and a provision device 306.

Read-in device 302 of server 110 is designed for reading in information signal 114 and position signal 116 via an interface to a vehicle device of the vehicle. Comparison device 304 of server 110 is designed for comparing the recognized traffic sign to a sign noted on a map that is stored on the server, at the instantaneous position of the vehicle, using information signal 114 and position signal 116. Provision device 306 of server 110 is designed for providing a confirmation signal 118 at an interface to the vehicle device of the vehicle when comparison device 304 shows a match of the recognized traffic sign with the sign that is noted on the map at the relevant position of the vehicle.

According to one exemplary embodiment, the vehicle may incorrectly recognize a certain traffic sign. In this case, the comparison and the feedback of server 110 are negative. Therefore, a negative signal 308 is provided at the interface to the vehicle device which indicates that the comparison results in no match of the recognized traffic sign with the sign that is noted on the map at the relevant position of the vehicle. Server 110 thus provides, together with negative signal 308, a piece of information concerning the noted sign from the stored map at the interface to the vehicle device of the vehicle. This stored sign from the server 110 is now used as the truth in the vehicle in order to indicate something to the driver or to control the autonomous vehicle.

According to one exemplary embodiment, the vehicle may recognize a traffic sign that is not yet known to server 110. This may be the case, for example, when the vehicle is traveling through a construction site. In this case, an "unknown" signal 310 is provided at the interface to the vehicle device when no sign is noted on the stored map at the instantaneous position of the vehicle. The new traffic sign is hereby recorded in server 110, but with a low confidence level, since up to this point the traffic sign has been recognized by only one vehicle. Server 110 reports the confidence level back to the vehicle. The vehicle initially relies totally on the newly recognized traffic sign, since a comparison with the sign stored on the map of the server is not yet possible. The autonomous vehicle is controlled in this road section with appropriate caution. As soon as another vehicle has recognized the traffic sign at the same position, a comparison with server 110 takes place, the confidence level for this traffic sign being raised when there is a positive comparison. When a traffic sign stored on server 110 has a high confidence level, the traffic sign is used in the vehicle as the truth if the vehicle has not correctly recognized the sign. In contrast, when the traffic sign has a low confidence level, the vehicle preferably relies on its own traffic sign recognition.

Figure 4:
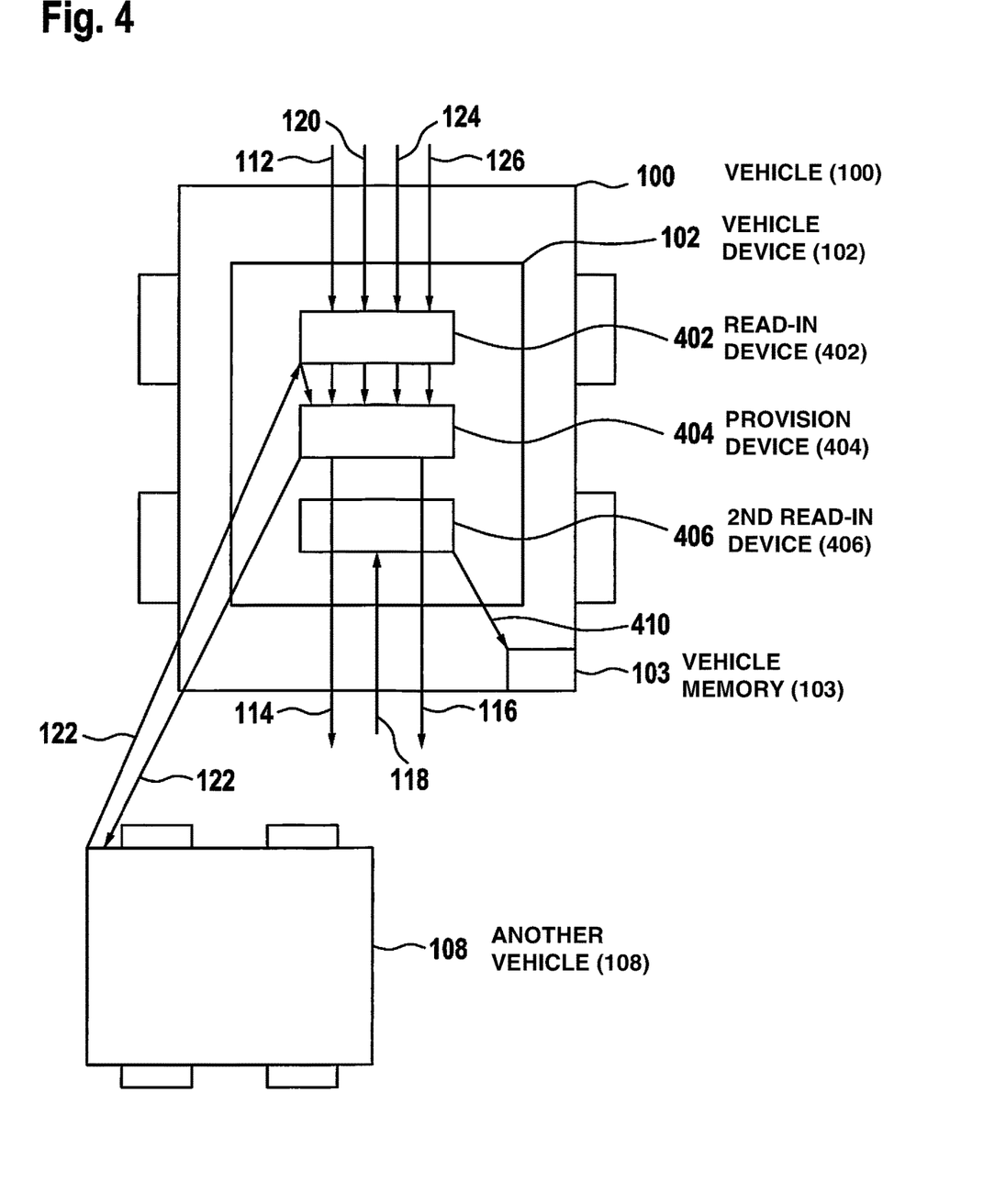
FIG. 4 shows a schematic view of a vehicle that includes a vehicle device according to one exemplary embodiment.

FIG. 4 shows a schematic view of a vehicle 100 that includes a vehicle device 102 according to one exemplary embodiment. Vehicle 100 with vehicle device 102 shown in FIG. 4 may be, for example, vehicle 100 with vehicle device 102 shown in FIG. 1. In addition to vehicle device 102, vehicle 100 optionally includes a vehicle memory 103. Vehicle device 102 includes a read-in device 402, a provision device 404, and a second read-in device 406. FIG. 4 also illustrates other vehicle 108, which may be, for example, other vehicle 108 from FIG. 1.

Read-in device 402 of vehicle device 102 is designed for reading in recognition signal 112 via an interface to the optical sensor of vehicle 100. Recognition signal 112 represents a recognized traffic sign in road traffic. Provision device 404 of vehicle device 102 is designed for providing information signal 114 and position signal 116 at an interface to the server, using recognition signal 112. Information signal 114 represents a piece of information concerning the traffic sign, and position signal 116 represents an instantaneous position of vehicle 100. Second read-in device 406 is designed for reading in confirmation signal 118, which represents a match of the recognized traffic sign with a sign that is noted on a map at the instantaneous position of vehicle 100, via the interface to the server.

According to one exemplary embodiment, it is possible that vehicle 100 may fail to detect the traffic sign due to it being concealed at that moment or not clearly visible due to poor weather conditions. In this case, read-in device 402 is designed for reading in uncertainty signal 120 via an interface to the optical sensor of vehicle 100. Uncertainty signal 120 represents an uncertainty in recognizing the traffic sign in road traffic. In this case, provision device 404 is designed for providing position signal 116 directly at the interface to the server, using uncertainty signal 120. The server may now transmit the correct sign from the map stored on server, via the car-to-X communication link to vehicle 100, at the correct point in time.

According to one exemplary embodiment, it is possible that vehicle 100 may fail to detect a traffic sign due to it being concealed at that moment or not clearly visible. In this case, when a traffic sign is not recognized, read-in device 402 is designed for reading in sign recognition information signal 122 from an interface to another vehicle 108. In this case, provision device 404 is designed for providing information signal 114 at the interface to the server, using sign recognition information signal 122. Accordingly, vehicle 100 automatically receives a piece of sign recognition information from the other vehicle and transmits this information to server 110. In this specific embodiment, the same applies for host vehicle 100, which automatically relays a recognized traffic sign to nearby other vehicle 108. Provision device 404 of vehicle 100 is thus designed for providing a piece of information concerning a recognized traffic sign, as a sign recognition information signal 122, to other vehicle 108, using information signal 114 and position signal 116.

According to one exemplary embodiment, read-in device 402 of vehicle device 102 is also designed for reading in speed signal 124, which represents an instantaneous speed of vehicle 100, and/or distance signal 126, which represents an instantaneous distance of vehicle 100 from the traffic sign. Provision device 404 is designed for providing speed signal 124 and/or distance signal 126 at the interface to the server. With the aid of the signal propagation times of the transmission and the transmitted information, the traffic sign on the server may be compared even more accurately with regard to a map position.

According to one specific embodiment, second read-in device 406 is designed for reading in a piece of information concerning the traffic sign which is recognized as correct, using confirmation signal 118, and providing this information concerning the traffic sign which is recognized as correct, as traffic sign information signal 410, via an interface to vehicle memory 103, using confirmation signal 118, the information concerning the traffic sign which is recognized as correct being stored there when confirmation signal 118 represents a match. The information concerning the traffic sign which is recognized as correct may be stored for the duration of a trip, or for longer. For the case that vehicle 100 is clocked after a sign recognition, a comparison with the stored data for this road section takes place. If the sign recognition has not functioned correctly, the speed trap operation, for example, is not valid. On the other hand, an explicit violation due to speeding may therefore be punished more easily.

According to one exemplary embodiment, it is possible that vehicle 100 may fail to detect the traffic sign due to it being concealed at that moment or not clearly visible due to poor weather conditions. In this case, read-in device 402 of vehicle device 102 is designed for reading in uncertainty signal 120 via an interface to the optical sensor of vehicle 100. Uncertainty signal 120 represents an uncertainty in recognizing the traffic sign in road traffic. Provision device 404 is designed for subsequently providing position signal 116, i.e., a piece of information concerning an instantaneous position of vehicle 100, directly at the interface to the server, using uncertainty signal 120; the server may now transmit the correct sign from the map stored on the server, via the car-to-X communication link to vehicle 100, at the correct point in time. For example, vehicle 100 may begin with transmitting strictly the vehicle position as soon as the image recognition falls below a certain confidence value. In bad weather, vehicle 100 may automatically dispense with its own sign recognition and rely solely on the information concerning the sign that has been received in the server. In bad weather, it is also conceivable for the server to discard any traffic signs that are recognized from the vehicle 100, and to transmit back only the map-based signs at the determined sign position, via the car-to-X communication link to vehicle 100. Subsequently, vehicle 100 may be controlled, as usual, using the received information.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for checking a plausibility of a recognition of a traffic sign for an autonomously driving vehicle, the method comprising:
reading in an information signal and a position signal via an interface to a vehicle device of the vehicle, the information signal representing a piece of information concerning a traffic sign in road traffic that is recognized using an optical sensor of the vehicle, and the position signal representing an instantaneous position of the vehicle;
comparing the recognized traffic sign to a sign that is noted on a stored map at the instantaneous position of the vehicle, the comparing being performed based on the information signal and the position signal; and
providing a confirmation signal at the interface to the vehicle device when the comparing results in a match of the recognized traffic sign with the sign that is noted on the map at a relevant position of the vehicle;
wherein the reading in includes reading in an uncertainty signal, wherein the uncertainty signal represents an uncertainty in recognizing the traffic sign in road traffic that is recognized using the optical sensor of the vehicle, and wherein the position signal is provided using the uncertainty signal, and
wherein the uncertainty in recognizing the traffic sign results because the traffic sign is at least partially concealed because of an obstruction or not fully visible due to weather conditions.

2. The method as recited in claim 1, wherein in the step of providing, a negative signal is provided at the interface to the vehicle device when the step of comparing does not result in a match of the recognized traffic sign with the sign that is noted on the map at the relevant position of the vehicle.

3. The method as recited in claim 2, wherein in the step of providing, a piece of information concerning the noted sign is provided at the interface to the vehicle device.

4. The method as recited in claim 1, wherein in the step of providing, an "unknown" signal is provided at the interface to the vehicle device when no sign is noted on the stored map at the instantaneous position of the vehicle.

5. A method for recognizing a traffic sign for an autonomously driving vehicle, the method comprising:
reading in a recognition signal representing a traffic sign in road traffic that is recognized using an optical sensor of the vehicle;
providing an information signal and a position signal at an interface to a server based on the recognition signal, the information signal representing a piece of information concerning the traffic sign, and the position signal representing an instantaneous position of the vehicle; and
reading in a confirmation signal that represents a match of the recognized traffic sign with a sign that is noted on a map at the instantaneous position of the vehicle, via the interface to the server,
wherein the reading in includes reading in an uncertainty signal, wherein the uncertainty signal represents an uncertainty in recognizing the traffic sign in road traffic that is recognized using the optical sensor of the vehicle, and
wherein the uncertainty in recognizing the traffic sign results because the traffic sign is at least partially concealed because of an obstruction or not fully visible due to weather conditions.

6. The method as recited in claim 5, wherein:
the position signal is provided using the uncertainty signal.

7. The method as recited in claim 5, wherein:
the step of reading includes reading in a sign recognition information signal from an interface to another vehicle, and
the step of providing includes using the sign recognition information signal to provide the information signal at the interface to the server.

8. The method as recited in claim 5, wherein in the step providing the vehicle provides a piece of information concerning the recognized traffic sign as a sign recognition information signal to another vehicle, using the information signal and the position signal.

9. The method as recited in claim 1, wherein the step of providing includes providing at the interface to the server at least one of a speed signal that represents an instantaneous speed of the vehicle and a distance signal that represents an instantaneous distance of the vehicle from the traffic sign.

10. The method as recited in claim 1, wherein in the step of reading in the confirmation signal, a traffic sign that is recognized as correct is stored in a vehicle memory when the confirmation signal represents a match.

11. A method for traffic sign recognition, the method comprising:
   reading in a recognition signal representing a traffic sign in road traffic that is recognized using an optical sensor of the vehicle;
   providing an information signal and a position signal at an interface to a server based on the recognition signal, the information signal representing a piece of information concerning the traffic sign, and the position signal representing an instantaneous position of the vehicle; and
   reading in a confirmation signal that represents a match of the recognized traffic sign with a sign that is noted on a map at the instantaneous position of the vehicle, via the interface to the server;
   reading in an information signal and a position signal via an interface to a vehicle device of the vehicle, the information signal representing a piece of information concerning the traffic sign in road traffic that is recognized using the optical sensor of the vehicle, and the position signal representing the instantaneous position of the vehicle;
   comparing the recognized traffic sign to a sign that is noted on a stored map at the instantaneous position of the vehicle, the comparing being performed based on the information signal and the position signal; and
   providing the confirmation signal at the interface to the vehicle device when the comparing results in a match of the recognized traffic sign with the sign that is noted on the map at a relevant position of the vehicle;
   wherein the reading in includes reading in an uncertainty signal, wherein the uncertainty signal represents an uncertainty in recognizing the traffic sign in road traffic that is recognized using the optical sensor of the vehicle, and
   wherein the uncertainty in recognizing the traffic sign results because the traffic sign is at least partially concealed because of an obstruction or not fully visible due to weather conditions.

12. A vehicle device, comprising:
   a system for carrying out a method for checking a plausibility of a recognition of a traffic sign for an autonomously driving vehicle, the method comprising:
   reading in an information signal and a position signal via an interface to a vehicle device of the vehicle, the information signal representing a piece of information concerning a traffic sign in road traffic that is recognized using an optical sensor of the vehicle, and the position signal representing an instantaneous position of the vehicle;
   comparing the recognized traffic sign to a sign that is noted on a stored map at the instantaneous position of the vehicle, the comparing being performed based on the information signal and the position signal; and
   providing a confirmation signal at the interface to the vehicle device when the comparing results in a match of the recognized traffic sign with the sign that is noted on the map at a relevant position of the vehicle;
   wherein the reading in includes reading in an uncertainty signal, wherein the uncertainty signal represents an uncertainty in recognizing the traffic sign in road traffic that is recognized using the optical sensor of the vehicle, and
   wherein the uncertainty in recognizing the traffic sign results because the traffic sign is at least partially concealed because of an obstruction or not fully visible due to weather conditions.

13. A non-transitory computer readable medium, having a computer program, which is executable by a processor, comprising:
   a program code arrangement having program code for checking a plausibility of a recognition of a traffic sign for an autonomously driving vehicle, by performing the following:
   reading in an information signal and a position signal via an interface to a vehicle device of the vehicle, the information signal representing a piece of information concerning a traffic sign in road traffic that is recognized using an optical sensor of the vehicle, and the position signal representing an instantaneous position of the vehicle;
   comparing the recognized traffic sign to a sign that is noted on a stored map at the instantaneous position of the vehicle, the comparing being performed based on the information signal and the position signal; and
   providing a confirmation signal at the interface to the vehicle device when the comparing results in a match of the recognized traffic sign with the sign that is noted on the map at a relevant position of the vehicle;
   wherein the reading in includes reading in an uncertainty signal, wherein the uncertainty signal represents an uncertainty in recognizing the traffic sign in road traffic that is recognized using the optical sensor of the vehicle, and
   wherein the uncertainty in recognizing the traffic sign results because the traffic sign is at least partially concealed because of an obstruction or not fully visible due to weather conditions.

14. The computer readable memory of claim 13, wherein in the providing of the confirmation signal, a negative signal is provided at the interface to the vehicle device when the step of comparing does not result in a match of the recognized traffic sign with the sign that is noted on the map at the relevant position of the vehicle.

* * * * *